Sept. 2, 1941.   E. A. MALLETT   2,254,436
SECONDARY CIRCUIT CONNECTION
Filed July 18, 1940
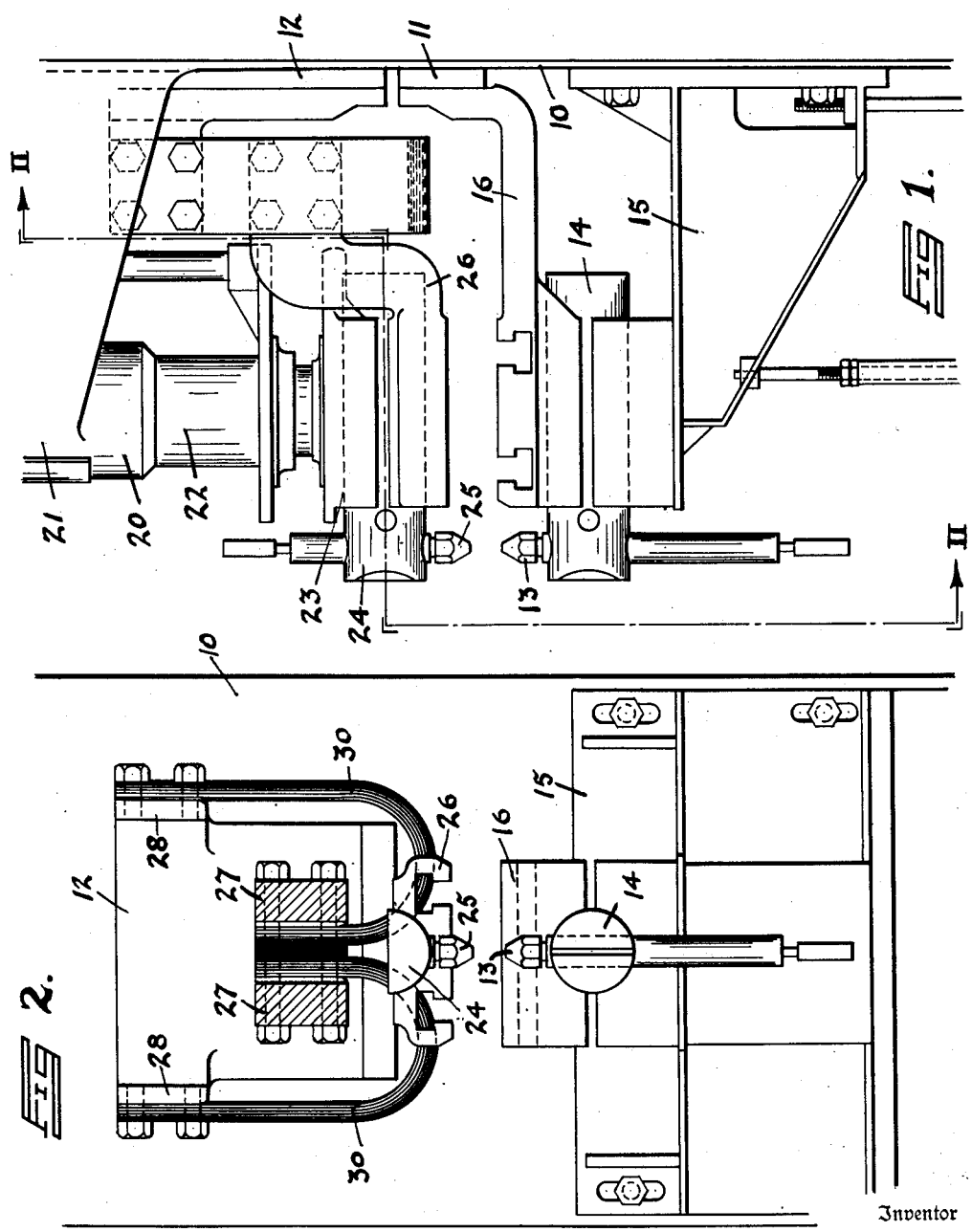
Inventor
EDWIN A. MALLETT
By Francis J. Kempay
Attorney Patented Sept. 2, 1941

2,254,436

UNITED STATES PATENT OFFICE 2,254,436

SECONDARY CIRCUIT CONNECTION

Edwin A. Mallett, Warren, Ohio, assignor to Taylor-Winfield Corporation, Warren, Ohio, a corporation of Ohio Application July 18, 1940, Serial No. 346,167

5 Claims. (Cl. 219—4)

This invention relates to an electric welding machine and more particularly to an improved arrangement of flexibly connecting one fixed secondary terminal of a welding transformer with a movable electrode of the welding machine.

In accordance with usual practice the movable electrode, which is movable towards and away from the fixed electrode of the machine, is carried by a slidable member which is suitably guided in the framework of the machine. To provide the flexible connection between the transformer secondary and the movable electrode it has been common practice to utilize a plurality of flat flexible bands connected at one end with the transformer secondary terminal and at their other ends with a block rigidly attached to the movable electrode holder. Freedom of movement of the holder is aided by looping the flexible bands about an axis extending perpendicular to the direction of movement of the movable electrode.

As a result of the above described construction there is a lateral force applied to the slide supporting the movable electrode of the machine due to the inherent spring force exerted by the bands and also due to the force exerted in the same direction by the heavy flow of current through the bands, which flow tends to straighten out the looped bands. This increases substantially the friction between the guide members and the electrode supporting slide and mitigates against the most desirable operating characteristic of the machine. It is, of course, desirable that the movable electrode be free to move especially upon the softening of the metal to effect a quick forging movement without undue upsetting of the metal. This is difficult to accomplish when the electrode carrier tends to stick and upon release jumps forward with a surging motion.

The primary object of the invention is to overcome the above mentioned objectionable operating characteristics of the apparatus of the present construction and this is accomplished in accordance with the invention by utilizing two looped sets of conductor bands extending from the transformer terminal to the electrode holder in opposed relation in such manner that the outward forces exerted by the looped bands by reason of their inherent resiliency and the flow of current therethrough are equal and opposite with the result that no lateral force from the flexible connecting bands is exerted on the guides for the movable electrode slide.

Another object of the invention is the provision of an improved construction for a welding machine incorporating the features and having the operating characteristics pointed out above.

These and other objects and advantages of the invention will become apparent from a consideration of the following detailed specification and the accompanying drawing wherein there is specifically disclosed a preferred embodiment of the invention.

In the drawing:

Figure 1 is a side view of a portion of a welding machine utilizing the principles of the present invention; and Figure 2 is a front view partly in section of the apparatus of Figure 1, the view being taken along the line II—II of Figure 1.

In the drawing, reference numeral 10 indicates generally the main frame of the welding machine which in accordance with usual practice encloses and supports the welding transformer, which transformer may have a pair of fixed secondary terminals 11 and 12. The normally fixed electrode 13 of the machine is supported in a holder 14 which in turn is supported on a bracket 15 adjustably secured to the front face of the frame 10. Welding current may be conducted to the holder 14 by a rigid bar 16 which is connected with the secondary terminal 11.

As stated above, suitable means may be provided to slidably support the movable electrode of the machine and in accordance with the apparatus specifically illustrated this may consist of a cylindrical member 20 carried at the outer end of a bracket 21 extending outwardly from the front face of the frame or housing 10 and a quill 22 slidably received in the bore of the guide 20. Quill 22 is adapted to be moved vertically by suitable fluid pressure or mechanical means (not shown) and carries at its lower end a chuck 23 adapted to partially receive an electrode holder 24. Carried by the outer end of the holder 24 is the normally movable electrode 25 and positioned below the holder 24 and provided with a recess to receive a portion of the holder is a connecting bar 26 which is suitably clamped to the chuck 23 and holder 24 by any suitable means (not shown).

The inner end of the bar 26 extends upwardly and inwardly, as shown in Figure 1 of the drawing, and has its inner end bifurcated at 27, as shown in Figure 2 of the drawing. Transformer secondary 12 is of substantial width—considerably wider than the width of the bifurcations 27 and extending forwardly from each side edge of the terminal 12 is a lug 28.

Extending from each of the lugs 28 to one of the bifurcations 27 is a conductor 30 which, as shown, is looped downwardly to provide sufficient flexibility and length of material to enable the bifurcations 27 to be moved vertically relative to the lugs 28. One end of each of the conductors 30 is securely fastened to one of the lugs 28 of the fixed secondary terminal 12 and the other end is rigidly connected with one of the bifurcations 27. Conductors 30 are, in accordance with usual practice, built up of a plurality of thin flexible bands of highly conductive material. It should be apparent by referring to Figure 2 that any expansive force exerted in a horizontal direction by either one of the looped conductors, by reason of the inherent resiliency in the looped conductors or by the flow of heavy welding current therethrough, will be opposed in equal measure by a similar force exerted by the other of the looped conductors. Thus, no horizontally disposed force will be transmitted through the member 26 to the quill or slide 22 during operation of the machine and consequently friction between the slide and its guide 20 will be kept to a minimum. The tendency of the quill or slide to cant and stick in its guide is materially reduced and the machine may be operated with better results. By positioning the flexible conductors 30 on the diametrically opposite side of the axis of the quill 22 from the electrode 25 the forces reacting against vertically downward movement of the quill 22 during operation of the machine are balanced to a certain extent since the movement in one direction, caused by the force exerted on the tip of electrode 25, is offset to a certain extent by the movement in the opposite direction exerted by the conductors 30 acting through the longer arm from the conductors to the axis of the quill.

The above specifically described embodiment of the invention should be considered as illustrative only as many changes may be made therein without departing from the spirit or scope of the invention. For example, other means than the bifurcated bars 26 may be employed to conduct welding current from the flexible conductors to the movable welding electrode and various changes may be made in the arrangement of the two looped flexible conductors. The inner adjacent ends of the conductors may be clamped together and attached rigidly to the movable electrode holder or these ends may be connected with the fixed secondary terminal of the transformer and the divergent ends connected with the electrode holder. The slide 22 may assume a wide variety of different forms and the electrode holder may either be rigidly connected therewith or, as indicated in the drawing, the connection may be made through an air lock as fully disclosed in the co-pending application of Stanley M. Humphrey, Serial Number 306,127, filed November 25, 1939. Reference should therefore be had to the appended claims in determining the scope of the invention.

What I claim is:

1. In an electric welding machine the combination with a welding transformer having a pair of fixed secondary terminals, a normally fixed electrode, and a movable electrode, of means to convey welding current from one of said fixed terminals to the movable electrode comprising a pair of spaced parallel lugs rigidly connected with the said one of said terminals, a member electrically connected with said movable electrode and having a portion extending between but below said lugs, and a flexible conductor comprising laminations of flexible bands connected to each of said lugs and looped downwardly and inwardly towards said extended portion of said member, and means to connect the inner adjacent ends of each of said conductors with said extended portion of said member.

2. In an electric welding machine the combination with a welding transformer having a pair of fixed secondary terminals, a normally fixed electrode, a movable electrode, a slide supporting said movable electrode, and a guide for said slide, of means to convey welding current from one of said fixed terminals to the movable electrode comprising a pair of spaced parallel lugs rigidly connected with the said one of said terminals, a member electrically connected with said movable electrode and having a portion extending between but below said lugs, and a flexible conductor comprising laminations of flexible bands connected to each of said lugs and looped downwardly and inwardly towards said extended portion of said member, and means to connect the inner adjacent ends of each of said conductors with said extended portion of said member.

3. In an electric welding machine the combination with a welding transformer having a pair of fixed secondary terminals, a normally fixed electrode, a movable electrode, a slide supporting said movable electrode, and a guide for said slide, of means to conduct welding current to said movable electrode comprising a pair of flexible conductors each consisting of laminations of flexible bands, said conductors being looped inwardly towards each other, a conducting member connected with said movable electrode, means to secure the inner adjacent ends of said flexible conductors to said member, and means to secure the outer ends of said flexible conductors to one of the fixed secondary terminals of said transformer.

4. In an electric welding machine the combination with a welding transformer, a normally fixed electrode connected with one of the terminals of the transformer secondary, a movable electrode, a slide supporting said movable electrode, and a guide for said slide, of means to conduct welding current from the other of the terminals of said transformer secondary to said movable electrode comprising a pair of flexible conductors each consisting of laminations of flexible bands, a conducting member connected with said movable electrode, the said other of said transformer secondary terminals comprising a conducting member, said flexible conductors being looped inwardly toward each other, means to secure the inner adjacent ends of said flexible conductors to one of said members, and means to secure the outer ends of said flexible conductors to the other of said members.

5. In an electric welding machine the combination with a welding transformer, a normally fixed electrode connected with one of the terminals of the transformer secondary, a movable electrode, a slide supporting said movable electrode, and a guide for said slide, of means to conduct welding current to said movable electrode comprising a pair of flexible conductors looped inwardly towards each other, a conducting member connected with said movable electrode, a second conducting member constituting the other terminal of said transformer secondary, means to secure the inner adjacent ends of said flexible conductors to one of said members, and means to secure the other ends of said flexible conductors to the other of said members, the arrangement of the parts being such that substantially no lateral force is exerted on said slide by said conductors.

EDWIN A. MALLETT.